United States Patent [19]
Holeman

[11] 3,875,406
[45] Apr. 1, 1975

[54] OPTICAL SYSTEM FOR AUTOMATIC METER READER

[75] Inventor: John M. Holeman, Schenectady, N.Y.

[73] Assignee: General Electric Company, Schenectady, N.Y.

[22] Filed: Mar. 25, 1974

[21] Appl. No.: 454,410

Related U.S. Application Data
[63] Continuation of Ser. No. 348,745, April 6, 1973, abandoned.

[52] U.S. Cl............. 250/231 SE, 324/175, 340/151
[51] Int. Cl. .............................................. G01d 5/34
[58] Field of Search ...... 250/231 R, 231 SE, 237 R, 250/237 G, 570; 324/96, 97, 175; 340/150, 151; 350/201

[56] References Cited
UNITED STATES PATENTS

| | | | |
|---|---|---|---|
| 3,328,591 | 6/1967 | Jones............................ | 250/231 SE |
| 3,400,275 | 9/1968 | Trump........................... | 250/231 SE |
| 3,503,061 | 3/1970 | Bray.............................. | 340/151 |
| 3,525,094 | 8/1970 | Leonard........................ | 250/231 SE |
| 3,527,533 | 9/1970 | Hook............................. | 350/201 |
| 3,549,897 | 12/1970 | Blake............................ | 250/231 SE |
| 3,689,160 | 9/1972 | Shimulenis.................... | 250/231 SE |

Primary Examiner—James W. Lawrence
Assistant Examiner—D. C. Nelms
Attorney, Agent, or Firm—Paul F. Wille; Joseph T. Cohen; Jerome C. Squillaro

[57] ABSTRACT

An optical system, comprising a single light source, collimating optics, collecting optics, and a detector, sequentially scans coded, apertured discs to produce a pulse code indicative of the rotational position of said discs.

7 Claims, 2 Drawing Figures

OPTICAL SYSTEM FOR AUTOMATIC METER READER

This is a continuation of Ser. No. 348,745 filed Apr. 6, 1973 now abandoned.

This invention relates to automatic or remote meter readers and, in particular, to an optical system for reading out meters containing coded, apertured discs.

In the power distribution and measuring art, there is a need for a remotely readable meter. In a given residential district, for example, each house may have a meter for monitoring electricity, gas, and water consumption, none of which may be owned by the same corporate entity. Multiplying that by the number of residences in the district, it becomes apparent that visually reading every meter adds substantially to the overhead of the utility supplying the particular service.

Considering as a specific example the electrical power industry and the familiar watt-hour meter, a number of mechanisms have been proposed for remotely reading electrical power consumption. For example, apertured discs having a plurality of light sources and a plurality of detectors for reading out the rotational position of each disc has been proposed. Alternatively, it has been suggested that digital pulses proportional to power consumed be generated and locally counted. Then, upon suitable command, the count is transmitted to a central station, typically by telephone link.

A difficulty with both of these proposals is cost. A further difficulty with the first proposal is the care required in assembling or positioning the optical elements. A further difficulty with the second proposal is that the information cannot be checked visually, i.e., the system is not fail-safe, wherein fail-safe does not mean the power is shut off, rather that the information (the meter reading) is lost.

As guidelines, the power companies have suggested that the remote reader have low cost, low maintainence, and be fail-safe. In addition, it is desirable that the unit be no bulkier than present devices.

In copending application Ser. No. 348,513, filed Apr. 6, 1973, and assigned to the assignee of the present invention, a fail-safe remote meter reading system having a unique coded disc arrangement for encoding the meter reading of a watt-hour meter is disclosed. The aperture disc arrangement described therein occupies very little additional space. Accordingly, it is desirable that the reading optics be comparably compact.

In view of the foregoing, it is therefore an object of the present invention to provide an optical system for reading out a plurality of aperture discs.

Another object of the present invention is to provide a compact optical system for use in reading a multitude of shaft position indicators in a single system.

A further object of the present invention is to provide a low cost optical system for reading apertured discs positions in a use meter.

Another object of the present invention is to provide an optical system for a remote reader system using aperture discs.

A further object of the present invention is to provide a high assembly tolerance optical system for automatic meter readers.

The foregoing objects are achieved in the present invention wherein there is provided a single light source, comprising an incandescent lamp, collimating optics, comprising a parabolic reflector, scanned aperture discs, collecting optics, comprising a pair of reflectors forming a folded path optical system, and a photodetector.

A more complete understanding of the present invention can be obtained by considering the following detailed description in conjunction with the accompanying drawings, in which.

Figure 1:
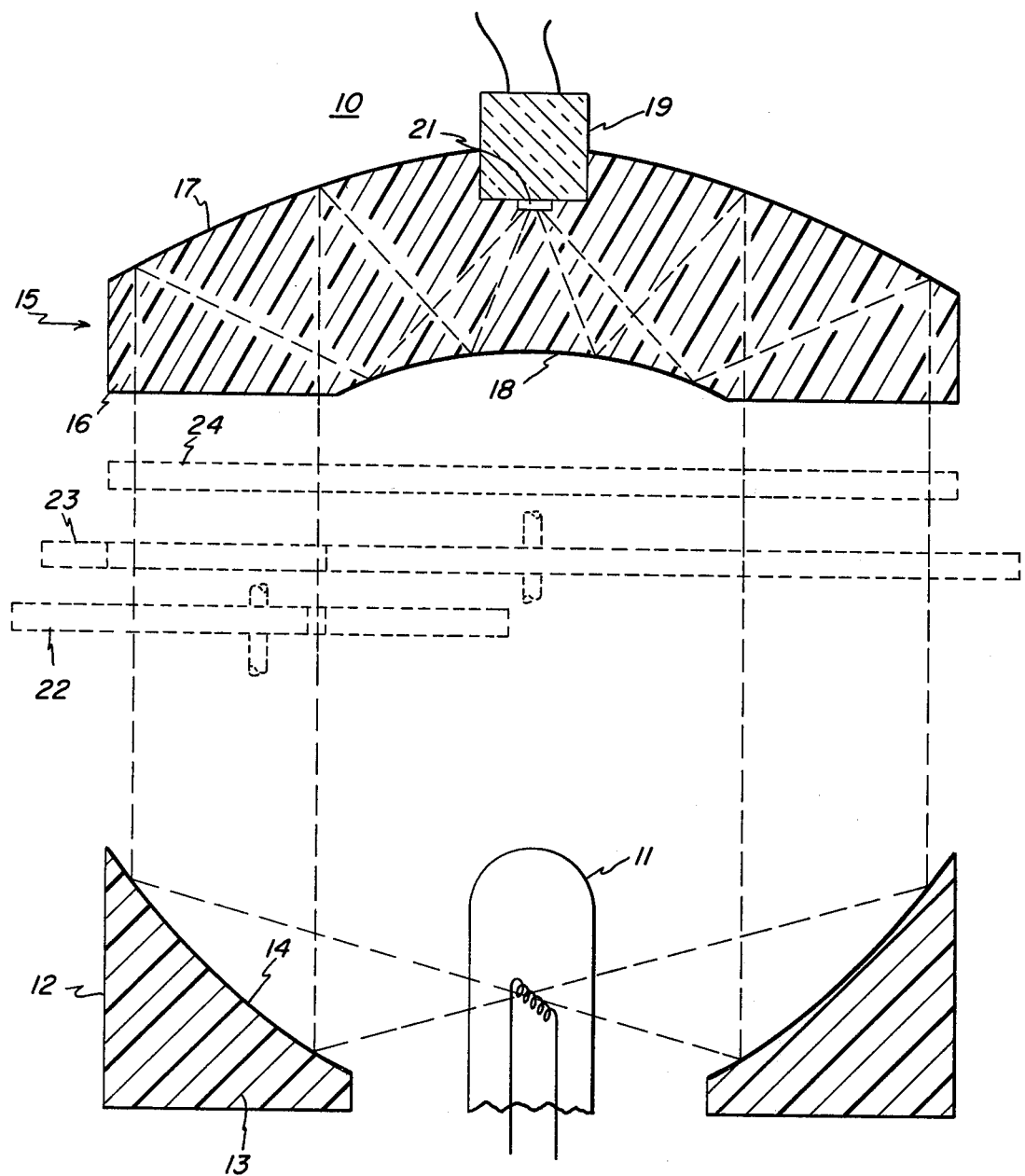
FIG. 1 illustrates a preferred embodiment of the optical system in accordance with the present invention.

As illustrated in FIG. 1, optical system 10 comprises a light source 11 and collimating optics 12 formed by an annular solid 13 having a parabolic surface 14 formed thereon. Parabolic surface 14 is suitably silver or aluminum coated to provide the necessary reflectance.

Optical system 10 further comprises collecting optics 15 formed by a solid 16 having first and second reflecting surface 17 and 18. Surface 17 is preferably a parabolic reflector and is also suitably silver or aluminum coated. Surface 18 is preferably hyperbolic and serves to focus the image of light source 11 onto photodetector 19, which preferably contains a semiconductor photocell 21. Reflecting surfaces 17 and 18 form a folded optical path for the light image from light source 11. The combination of a parabolic and hyperbolic reflector form what is known in the art as Cassegrainian optics. Other combinations of primary and secondary reflecting surfaces may be utilized, as for example, Dall-Kirkham optics, in which semi-elliptical and spherical surfaces are utilized as the primary and secondary reflectors, or Newtonian optics, using a parabolic reflector and a flat reflector.

Interposed between collimating optics 12 and collecting optics 15 are a plurality of masks or plates containing apertures. These plates, comprising code discs such as disc 22, a scanning disc 23, and a fixed aperture mask 24 provide the encoding of the rotational position of the indicia on the meter. The encoding of the rotational position of the indicia on the meter is more fully described in the above-identified copending application, Ser. No. 348,513, the disclosure of which is herein incorporated by reference.

Briefly, each code plate contains a plurality of arcuate apertures that are sequentially scanned by scanning disc 23. Fixed plate 24 contains a plurality of slits, one for each of code plates 22. In order for light to pass through plates 22, 23 and 24, it is necessary that the apertures therein be aligned so that the light may pass from collimating optics 12 to collecting optics 15. The slits in fixed plate 24 serve to insure that only one of discs 22 is read at a time. The positioning of the slits in disc 22 provides a coded output signal as it is scanned by the apertures in scanning disc 23. As scanning disc 23 traverses the arc containing each of code discs 22, a plurality of shaft position signals are obtained seriatum as the light from source 11 is interrupted or passed to collecting optics 15 and thence to photodetector 19.

There is thus provided a compact optical system for reading out a plurality of coded discs to provide an electrical signal indicative of the rotational position of a plurality of shafts by way of a single optical system having a single light source and a single photodetector. The optical system is stationary and securely fixed in place, yet a plurality of code discs can be scanned, depending upon the diameter of the code discs as compared to the diameter of the scanning disc.

Light source 11 preferably comprises a filament or incandescent type lamp having a relatively large filament. For example, a General Electric type No. 3026 lamp operating at a power dissipation of 3 watts has been found suitable. The light output from this lamp is far in excess of that required to read the discs. The large filament is utilized to obtain a large image on the detector side of the optics. In so doing, alignment tolerances are greatly increased (loosened) so that the optical system may be readily assembled on a mass production basis.

As previously noted, reflector elements 12 and 15 are formed from a clear plastic, such as acrylic, (methyl methacrylate) or Lexan polycarbonate, having suitably silver or aluminum coated surfaces to provide the necessary reflection. The curvature of the reflecting surfaces is provided by casting or pressing the plastic to the desired shape and then coating the reflecting surfaces.

Detector 19 may comprise any suitable photodetector. It is preferred however that the photosensitive area of the detector be relatively small so as to provide a high sensitivity, low noise detector. One commercially available detector found suitable for the present invention is a type 2N5777-80 photocell, also manufactured by the General Electric Company. This particular photocell has an active area of about 0.015 inches square. In theory, any photocell may be utilized. In practice, an active element whose diameter is less than 0.10 inch is preferred. The combination of large filament light source and small detector enables a wide assembly tolerance while maintaining a high sensitivity, low noise detection system for producing an error free output signal.

Figure 2:
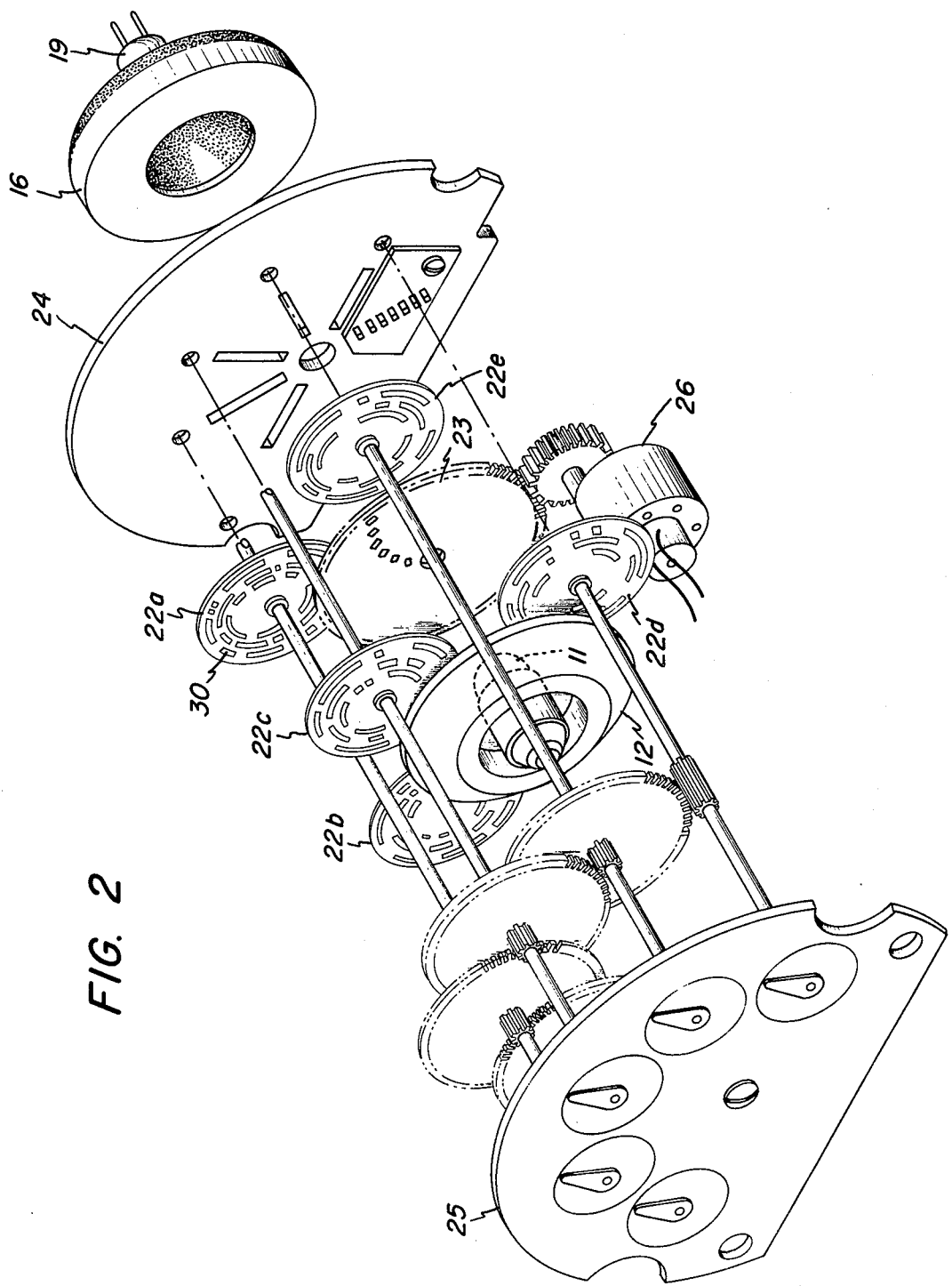
FIG. 2 illustrates in perspective a full readout system, including the optical system of the present invention.

The overall operation of the present invention in combination with a plurality of coded discs may best be understood by considering FIG. 2 in which a watt-hour meter is illustrated having a plurality of coded discs 22a–e attached one each to the shafts connected to a plurality of indicia used in obtaining a visual meter reading. As previously noted, scanning disc 23, in combination with the slits in fixed plate 24, scans each of coded discs 22 individually and provides a series of output pulses proportional to the rotational position of each of the indicia adjacent front plate 25. Scanning disc 23 may be turned by any suitable mechanism such as synchronous motor 26. The optical system of the present invention has a diameter equal to or slightly greater than the working diameter of scanning disc 23, i.e., the diameter to the outermost aperture.

In operation, in response to a signal from the central station, light source 11 is turned on and synchronous motor 26 is activated. Starting from a rest position scanning disc 23 sequentially scans the coded discs attached to each of the indicia adjacent plate 25. Scanning disc 23 is turned at a suitable rate, for example one revolution per second, to provide a beam path interruption rate well within the response time of photodetector 19, yet not so long as to unduly prolong the reading operation.

If telephone transmission lines are used as the link between the remote meter reader and the central station, it is most likely that the meters would be read at night when the telephone lines are relatively unused, as for example from 12 midnight to 6 a.m. Assuming a reading time of 1 second per meter, then 21,600 meters can be read in the 6 hour interval when the telephone lines are relatively inactive. Obviously, if the situation required it, the meter may be read at any time.

While not shown in either FIG. 1 or FIG. 2, a light shield surrounding the optical system may be provided so as to obviate erroneous readings of outdoor meters during the daytime.

There is thus provided by the present invention an improved meter reading optical system in which a plurality of coded discs are illuminated by a single light source and scanned, in effect, by a single photodetector. Further, the optical system of the present invention is compact and readily fits within the meter movement and coded discs utilized for remote reading. By virtue of the present invention the entire optical system is stationary while a plurality of rotating coded discs are scanned by an additional rotating scanning disc.

In view of the foregoing, it will be apparent to those of skill in the art that various modifications can be made within the spirit and scope of the present invention.

What I claim as new and desire to secure by Letters Patent of the United States is:

1. An improved stationary optical system for remote meter readers having a plurality of rotating aperture discs and a rotating scanning disc for scanning portions of said aperture discs comprising:
   an incandescent light source having a filament producing divergent light rays;
   collimating optics for collimating said divergent light rays and producing a beam of parallel light rays, said beam directed by said collimating optics through the apertures in said discs;
   collecting optics positioned to receive the light beam passing through said apertures from said collimating optics, said collecting optics comprising at least two reflectors for receiving said light beam and directing said light beam along a folded beam path to a focus to form an image of the filament of said incandescent light source; and
   photodetector means, positioned at said focus, having an active area for converting the light passing through said apertures into an electrical signal.

2. An improved optical system as set forth in claim 1 wherein the image of the filament of said incandescent light source is larger than the active area of said photodetector means.

3. An improved optical system as set forth in claim 1 wherein said collimating optics comprises a parabolic reflector.

4. An improved optical system as set forth in claim 1 wherein said collecting optics comprises a Cassegrainian reflector.

5. An improved optical system as set forth in claim 1 wherein said collimating optics has an optical axis, said collecting optics has an optical axis and said optical axes are collinear, forming the axis of said optical system, and said photodetector means is positioned on the axis of said optical system.

6. An improved stationary optical system for remote meter readers having a plurality of rotating aperture discs and a rotating scanning disc for scanning portions of said aperture discs comprising:
   an incandescent light source having a filament producing divergent light rays;

collimating optics for collimating said divergent light rays and producing a beam of parallel light rays, said beam directed by said collimating optics through the apertures in said discs;

collecting optics comprising at least two reflectors for receiving the light passing through said apertures and directing said light along a folded beam path to a focus;

photodetector means, positioned at said focus, for converting the light passing through said apertures into an electrical signal; and wherein the rotating motion of said scanning disc defines an axis of rotation and the optical axes of collimating optics and said collecting optics are parallel to and collinear with the axis of rotation of said scanning disc.

7. An improved optical system as set forth in claim 6 wherein said incandescent light source and said focus are located on said collinear axes.

* * * * *